(12) United States Patent
Yellin et al.

(10) Patent No.: US 7,421,687 B1
(45) Date of Patent: Sep. 2, 2008

(54) OPTIMIZING BRANCH CONDITION EXPRESSIONS IN A JIT COMPILER

(75) Inventors: Frank N. Yellin, Redwood City, CA (US); Yin Zin Mark Lam, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 747 days.

(21) Appl. No.: 10/939,194

(22) Filed: Sep. 9, 2004

Related U.S. Application Data

(60) Provisional application No. 60/510,045, filed on Oct. 8, 2003.

(51) Int. Cl.
*G06F 9/45* (2006.01)

(52) U.S. Cl. .................. 717/148; 717/160; 717/153

(58) Field of Classification Search .......... 717/148, 717/154, 160
See application file for complete search history.

(56) References Cited

U.S. PATENT DOCUMENTS

| | | | | |
|---|---|---|---|---|
| 5,987,256 A | * | 11/1999 | Wu et al. | 717/146 |
| 6,081,665 A | * | 6/2000 | Nilsen et al. | 717/116 |
| 6,110,226 A | * | 8/2000 | Bothner | 717/153 |
| 6,118,940 A | * | 9/2000 | Alexander et al. | 717/127 |
| 6,139,199 A | * | 10/2000 | Rodriguez | 717/159 |
| 6,170,083 B1 | * | 1/2001 | Adl-Tabatabai | 717/158 |
| 6,327,702 B1 | * | 12/2001 | Sauntry et al. | 717/118 |
| 6,513,156 B2 | * | 1/2003 | Bak et al. | 717/151 |
| 6,546,550 B1 | * | 4/2003 | Ogata et al. | 717/148 |
| 6,560,774 B1 | * | 5/2003 | Gordon et al. | 717/146 |
| 6,637,025 B1 | * | 10/2003 | Beadle et al. | 717/148 |
| 6,735,761 B1 | * | 5/2004 | Ogasawara | 717/140 |
| 6,966,057 B2 | * | 11/2005 | Lueh | 717/158 |
| 6,968,546 B2 | * | 11/2005 | Lueh | 717/158 |
| 7,076,773 B2 | * | 7/2006 | Schmidt | 717/148 |
| 7,089,544 B2 | * | 8/2006 | Hickson | 717/148 |
| 7,171,655 B2 | * | 1/2007 | Gordon et al. | 717/146 |
| 7,219,329 B2 | * | 5/2007 | Meijer et al. | 717/106 |
| 7,275,241 B2 | * | 9/2007 | Choi et al. | 717/143 |

* cited by examiner

*Primary Examiner*—Todd Ingberg
(74) *Attorney, Agent, or Firm*—Martine Penilla & Gencarella LLP

(57) ABSTRACT

A Java virtual machine includes a just in time (JIT) Java compiler. The JIT compiler includes at least one optimizer. Each of the at least one optimizer includes logic for recognizing a pattern in a received Java byte code, logic for optimizing the recognized pattern to produce optimized native code and logic for outputting optimized native code. A method of producing optimized native code is also provided.

12 Claims, 2 Drawing Sheets

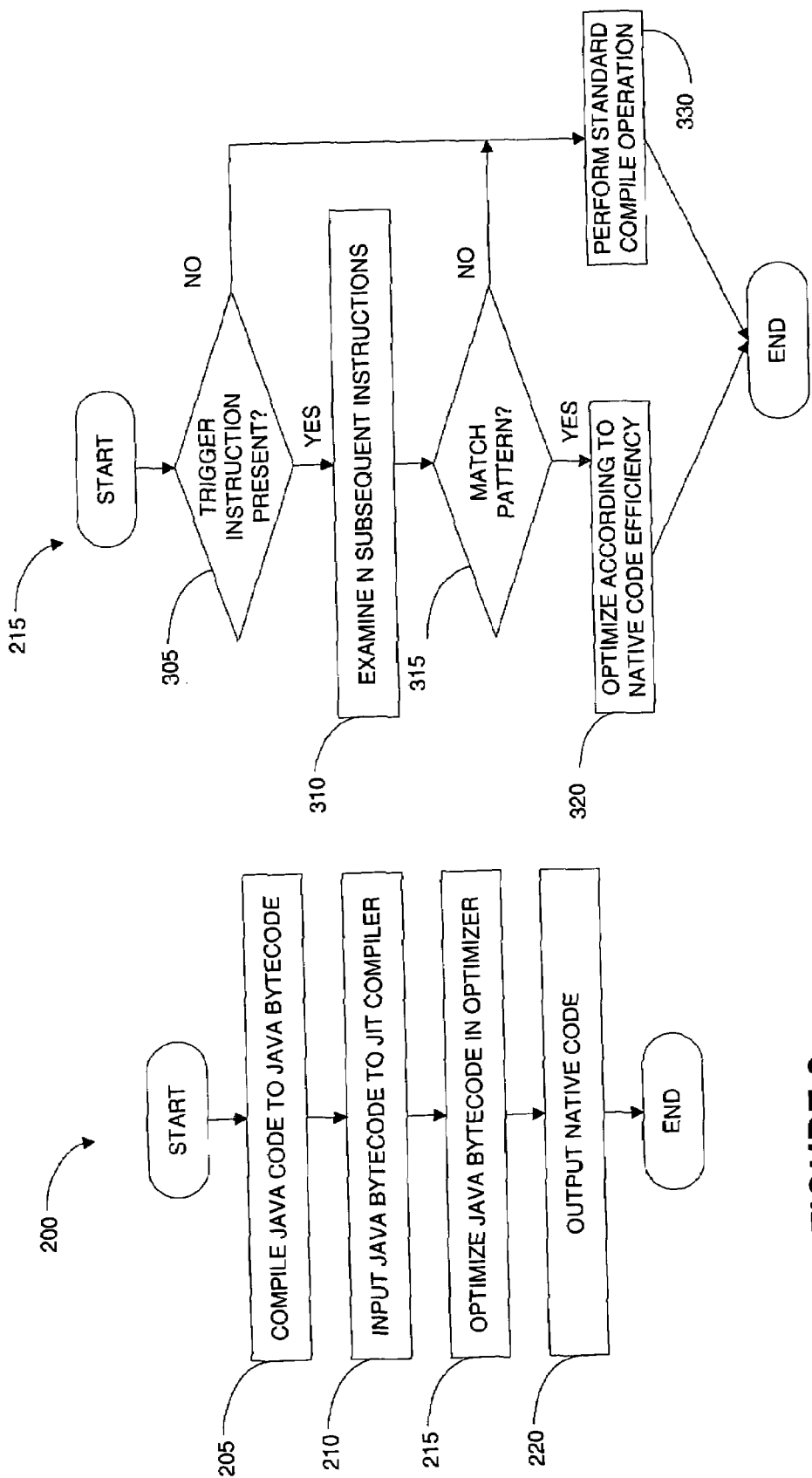

OPTIMIZING BRANCH CONDITION EXPRESSIONS IN A JIT COMPILER

CROSS REFERENCE TO RELATED APPLICATIONS

This application claims priority from U.S. Provisional Patent Application No. 60/510,045 filed on Oct. 8, 2003 and entitled "System and Method for Optimizing condition Expressions in a JIT Compiler," which is incorporated herein by reference in its entirety.

BACKGROUND OF THE INVENTION

1. Field of the Invention

The present invention relates generally to software code compliers, and more particularly, to methods and systems for just-in-time (JIT) compilers.

2. Description of the Related Art

Java source code is typically complied by a Java compiler to produce a corresponding Java byte code. The Java byte code can also be further compiled at run time to produce a machine or native code. The native code can then be executed on the processor. By way of example, an application that is written in Java can be compiled in a Java compiler to produce Java byte code for the application. When the Java byte code is selected for execution (i.e., launched), the Java byte code is further compiled to produce the native code. The native code can then be executed much quicker than the Java byte code by the processor.

Unfortunately, the above process can often produce native code that cannot be efficiently executed on the processor. By way of example, often branching instructions in the Java byte code or the native code can result in stalls or bubbles in the execution in the processor. As a result the application does not execute as quickly as it could and the overall performance of the computing device suffers.

This problem can be substantially exacerbated when the processor is customized for a particular application. By way of example, a processor in a handheld device (e.g., personal digital assistant (PDA), a cellular telephone, etc.) has substantially customized functionality when compared to a typical desktop personal computer or a server computer or other general-purpose computer. As a result, any stalls or bubbles in the execution of instructions by the processor can substantially impact the performance of the handheld device. In view of the foregoing, there is a need for a more efficient compilation process and system to substantially reduce the any stalls or bubbles in the execution pipeline of the processor.

SUMMARY OF THE INVENTION

Broadly speaking, the present invention fills these needs by providing a system and method of producing more machine code that can execute more efficiently. It should be appreciated that the present invention can be implemented in numerous ways, including as a process, an apparatus, a system, computer readable media, or a device. Several inventive embodiments of the present invention are described below.

One embodiment provides a Java virtual machine that includes a just in time (JIT) Java compiler. The JIT compiler includes at least one optimizer. Each of the at least one optimizer includes logic for recognizing a pattern in a received Java byte code, logic for optimizing the recognized pattern to produce optimized native code and logic for outputting optimized native code.

The least one optimizer can be at least partially coded in logic circuitry. The at least one optimizer can be at least partially coded in software.

The pattern in the received Java byte code can include a branching instruction that can be optimized in a native code conditional instruction.

Another embodiment provides a Java virtual machine that includes a just in time (JIT) Java compiler. The JIT compiler includes at least one optimizer that is at least partially coded in logic circuitry. Each of the at least one optimizer includes logic for recognizing a pattern in a received Java byte code that includes a branching instruction and that can be optimized in a native code conditional instruction. Each of the at least one optimizer also includes logic for optimizing the recognized pattern to produce optimized native code and logic for outputting optimized native code to a native processing platform.

Yet another embodiment provides a method of optimizing a Java byte code. The method includes receiving the Java byte code in a JIT compiler and analyzing the Java byte code to determine if the Java byte code includes one of a set of preselected patterns. The method can also include producing an optimized native code from the Java byte code including one of the preselected patterns and outputting the optimized native code.

The JIT compiler can be included in a Java virtual machine. The preselected patterns can include a branching instruction that can be optimized in a native code conditional instruction. The method can also include simplifying the branching instruction and a number of subsequent instructions into the native code conditional instruction.

Analyzing the Java byte code to determine if the Java byte code can include one of the preselected patterns includes recognizing a trigger-type instruction. The trigger-type instruction can be a forward branching instruction.

The preselected patterns can be encoded in the JIT compiler. If the trigger-type instruction is recognized, a number of subsequent instructions from the Java byte code can be examined. The number of subsequent instructions to be examined is determined by the recognized trigger-type instruction. Outputting the optimized native code can include outputting the optimized native code to a processor platform.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 2 is a flowchart of the method operations for compiling the Java source code, in accordance with one embodiment of the present invention.

FIG. 3 is a flowchart of the method operations for optimizing the Java source code, in accordance with one embodiment of the present invention.

DETAILED DESCRIPTION OF THE EXEMPLARY EMBODIMENTS

Figure 1:
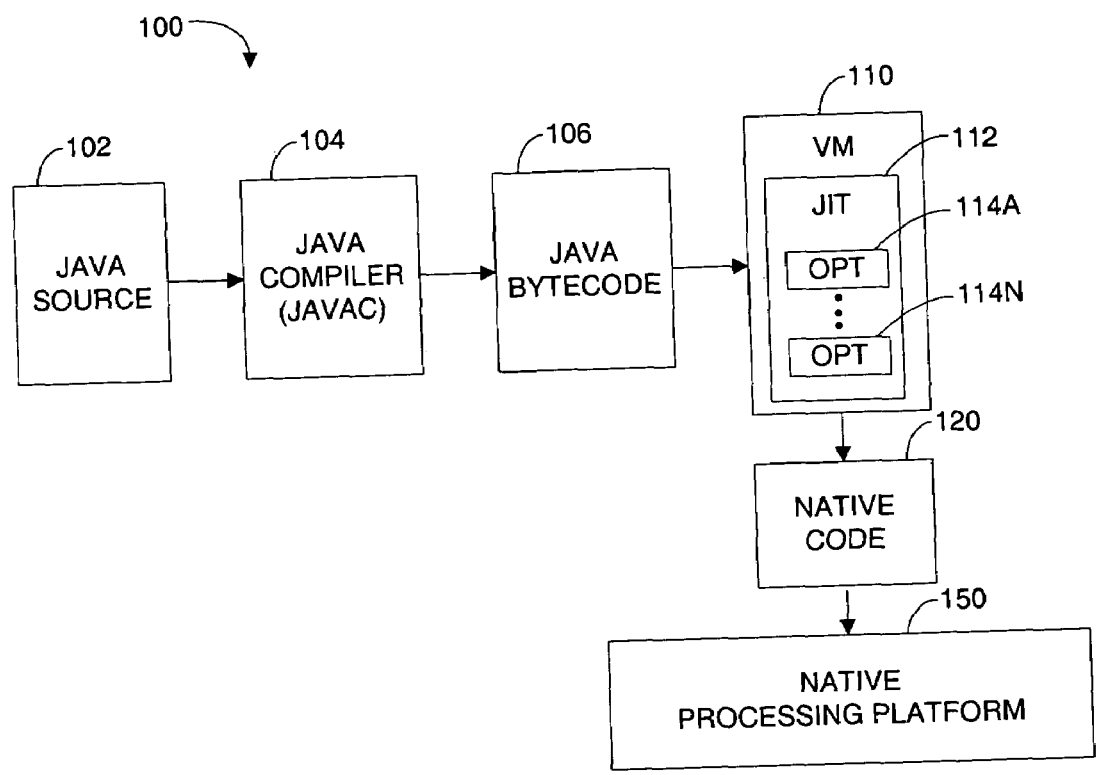
FIG. 1 is a block diagram of a system for compiling Java source code, in accordance with one embodiment of the present invention.

Several exemplary embodiments for a system and method of producing more machine code that can execute more efficiently will now be described. It will be apparent to those skilled in the art that the present invention may be practiced without some or all of the specific details set forth herein.

Java byte code and the resulting native code often includes forward branching instructions that refer to locations in the code that is beyond the current location in the code. These branches instructions can cause delays in processing until the referenced portion of the Java byte code is executed.

FIG. 1 is a block diagram of a system 100 for compiling Java source code, in accordance with one embodiment of the present invention. FIG. 2 is a flowchart of the method operations 200 for compiling the Java source code, in accordance with one embodiment of the present invention. In an operation 205, a Java source code 102 is input to a Java compiler 104 (i.e., JAVAC). The Java compiler 104 compiles the Java source code 102 to produce a Java class file that includes Java byte code 106 data and other data.

In an operation 210, the Java byte code 106 is input to a Java virtual machine (VM) 110. In an operation 215, the just in time (JIT) compiler 112 optimizes the Java byte code to produce an optimized native code 120. The optimized native code 120 is machine code that can be executed on a specific (i.e., native) processor or processing platform 150. The JIT compiler 112 is typically designed to utilize the precise features and capabilities of the native processing platform 150 to produce native code that is optimized to most efficiently use the features and capabilities of the native processing platform. As the Java byte code 106 is compiled in the JIT compiler 112, one or more optimizers 114A-114n optimize the Java byte code. The JIT compiler 112 is typically a very fast operating compiler so as to be capable of compiling the Java byte code in a near real time basis.

In an operation 220, the optimized native code 120 is output. The optimized native code 120 can be output to the native processing platform 150 for efficient execution.

FIG. 3 is a flowchart of the method operations 215 for optimizing the Java byte code, in accordance with one embodiment of the present invention. In an operation 305, optimizer 114A examines the incoming stream of Java byte code 106 to identify a trigger. The trigger can be an instruction type such as a compare operation or other branching type instruction or any other type of trigger. The trigger can also be a combination of instructions. If a trigger is detected, then the method operations continue in operation 310 below. If a trigger is not detected, then the method operations continue in operation 330 below.

In an operation 310, the optimizer 114A examines one or more instructions subsequent to the trigger (i.e., n subsequent instructions). The number of subsequent instructions to be examined is determined by the trigger. The number of subsequent instructions to be examined is can also be determined by one or more of the n subsequent instructions.

In an operation 315, the trigger and the n subsequent instructions are analyzed to determine if at least one of a set of instruction patterns is present. If the trigger and the n subsequent instructions match one of the sets of instruction patterns, then the method operations continue in operation 320 below. If the trigger and the n subsequent instructions do not match one of the sets of instruction patterns, then the method operations continue in operation 330 below.

In operation 320, the trigger and the n subsequent instructions are optimized in accordance with the identified pattern to optimize the trigger and the n subsequent instructions for the most efficient execution in the native processing platform. In one embodiment, the optimizer 114A outputs optimized native code 120 that is optimized for the target native processing platform 150. In alternative embodiments, the optimizer 114A outputs an optimized intermediate representation (IR) code that is subsequently compiled to optimized native code within the JIT compiler 112.

Several exemplary embodiments for systems and methods of optimizing condition expressions in a just in time (JIT) compiler will now be described. It will be apparent to those skilled in the art that the present invention may be practiced without some or all of the specific details set forth herein.

A JIT compiler 112 is a very efficient and fast operating compiler. The JIT compiler typically compiles the Java byte code in near real time, as the byte code is about to be executed. Optimizers 114A-n within the JIT compiler 112 are therefore very simple and fast executing optimizers so as to not substantially slow the operation of the JIT compiler. The optimizers 114A-n can be logic circuits or software or combinations thereof.

The following exemplary conditional code sequences and similar code sequences often occur in Java code:

i) if (<condition>) {
<variable> = <simple value>
}
ii) if (<condition>) {
<variable> += <constant>
}
iii) if (<condition>) {
<variable> = <simple value1>;
} else {
<variable> = <simple value2>;
}
iv) if (<condition>) {
return <simple_value1>;
} else {
return <simple value2>;
}

The <simple value> can be either a constant or the value of a variable.

A typical JIT compiler does not produce optimized native codes resulting from these above exemplary condition code snippets. The resulting native codes often have conditional and unconditional branches making the code less efficient in execution and also making it needlessly more difficult to recognize the original, logical structure of the code.

An example Java code sequence can include the following:
if (x == y) { z = x; } else { z = 10; }
where, assuming x is Local 1, y is Local 2, and z is Local 3, a typical compiler could generate the following Java code:
iload__1; // load x
iload__2; // load y
if_icmpne L1; // branch if not equal
iload__1; // load x;
istore__3; // store z;
goto L2; // join point
L1: bipush 10; // load 10
istore__3; if store 3;
L2:

A typical JIT compiler would generate the following native code for an exemplary native processing platform, in this example, the Advanced RISC Machines (ARM) architecture that is often used in handheld computing devices and other computing devices:
ldr r0, [fp - 16] // load x
ldr r1, [fp - 12] // load y
cmp r0, r1
bne L1
mov r2, r0

L2: <continue code after>
.....
L1: mov r3, #10
mov r2, r3
b L2

However on most modern architectures, conditional branch instructions are very expensive as such conditional branch instructions can cause the processor's pipeline to be flushed because the pipeline must "guess" whether the branch is taken or not. In addition, many modern architectures (e.g., ARM, Sun Microsystems' Sparc processors and other processing platforms) include the capability of processing conditional instructions. Therefore the above native code could be optimized and rewritten as:

ldr r0, [fp - 16]
ldr r1, [fp - 12]
cmp r1, r0
moveq r2, r0
movne r2, #10

The optimized native code executes much more efficiently since the branches have been replaced by simple conditional instructions.

One embodiment provides a method for quickly finding at least some of the more commonly known cases or patterns in which conditional instructions can generate optimized native code from the Java byte codes. The present system and method can be used whenever the compiler detects a trigger such as a conditional branch instruction in the Java byte codes to a location later in the Java byte code stream. Conditional branch instructions in the Java byte codes are typically 3-bytes long, however conditional branch instructions can also be shorter or longer than 3-bytes. In one embodiment, the next instruction can be at offset "next_i" and the destination of the branch can be "dest_i", resulting in dest_i> next_i.

"Condition" can be set to the condition under which the branch is taken. Typically the compiler has already generated the native code to set the condition code bits, but has not yet actually generated the code to generate the branch. Thus, for example, an "icmp_lt" instruction would have produced:

cmp <reg1>, <reg2> but has not yet generated the "blt <target>" instruction. In this case, <condition> would be "less than".

The method next analyzes the stream of subsequent Java byte codes for one of several previously identified patterns. For the purposes of explanation, the following example patterns are presented for discussion and the invention is not limited to only the following types of patterns. For each of the patterns, next_i refers to the offset from the beginning of the method of the instruction immediately following the conditional branch instruction. Further, dest_i refers to an offset from the beginning of the method to the instruction that is the target of the conditional branch instruction:

Pattern 1: The Java byte codes between next_i and dest_i are the single byte code instruction iinc or iinc_w, which increments a local variable by a constant amount.

Pattern 2: The Java byte codes between dest_i and next_i consist of exactly two instructions
  a) A simple load instruction (a load of a register or a simple constant)
  b) A store to a register Pattern 3: The Java byte codes between next_i and dest_i consist of precisely
  a) A simple load instruction
  b) zero or more non-control-flow instructions
  c) A return statement
  and then the instructions following dest_i are:
    a') A simple load instruction (possibly a different one)
    b') These must be precisely the same byte codes as b
    c') This must be the same Java byte code as c.

Pattern 4:
  a) A simple load instruction
  b) zero or more non-control-flow instructions
  c) a goto or goto_w statement where dest2_i is the offset from the beginning of the method of the goto or goto_w instruction and where dest2_i>dest_i
  and then the instructions following dest_i are precisely
    a') A simple load instruction
    b') These must be precisely the same Java byte codes as b
    and at this point you must be at dest2_i in the Java byte code.

A simple load instruction can include at least one of the following:
  aload, iload, fload, dload, lload_x
  aload_x, iload_x, fload_x, dload_x, lload_x
  bipush, sipush
  ldc A non-control flow instruction means any instruction that does not alter the flow of control. Unless the instruction causes an exception, the Java byte code that follows the non-control flow instruction is unconditionally executed next.

Note that Pattern 1 and Pattern 2 are simple regular expressions and can thus be typically recognized quite easily and efficiently. Pattern 3 and Pattern 4 are not regular expressions and are therefore can typically be more difficult to recognize. However each of Pattern 3 and Pattern 4 can be recognized by using a regular expression to recognize the prefix:

a b c a' and then a simple string comparison can be used to verify the remaining portion.

Due to the definition of the term <simple value>, Pattern 3 and Pattern 4 can be put into a register using a single machine instruction (e.g., either a ldr (load register from memory) or mov (load register from register or constant value)). Then the following is written:

mov<condition> <reg>, <simple value>

Either a mov or a ldr instruction are generated, depending on whether <simple value> is a value in memory or in a register.

For Pattern 1, the following native code is generated:
  [If necessary, load <variable> to a register.]
  add<not condition> <reg>, <reg>>, #<constant>

For Pattern 2, if the variable is already in a register, the following native code is generated:
  mov<not condition> <reg>, <simple value>

For pattern 2, if the variable is not in a register, the following native code is generated:
  [allocate a register <reg>]
  ldr<codition> <reg>, <location of variable>
  mov<not condition> <reg>, <simple value>

For Pattern 3, the following native code is generated:
  mov<not condition> <variable>, <simple value of a>
  mov<condition> <variable>, <simple value of a'>
  and then generate the native code for b normally.

For Pattern 4, native code generated is substantially the same as the code generated for Pattern 3, except the native code is then followed with the code for a "return".

Pattern 1 allows us to recognize Java byte code generated for:
  if (condition) { <variable> += <constant>; }

Pattern 2 allows us to recognize Java byte code generated for:

if (condition) { <variable> = <simple value>; }

Pattern 3 and Pattern 4 allow us to recognize a wide variety of Java byte code in which we must choose two perform the same action on one of two simple values. For example, Pattern 3 and Pattern 4 can recognize:

if (condition) { return x; } else { return y; } z = condition ? (x * 2) : (y * 2);

The above description is not limited to any particular native platform. The specific optimizations usable within the optimizers 114A-n may be platform specific or may be more generic and cover more than one native platform. Further, while the above-described improved optimizer has been described in terms of a Java environment (i.e., a Java VM), it should be understood that the improved optimizer could be applied to other object-oriented programming environments such as C++, C# (i.e., C-sharp) or others.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 2 and 3 are not required to be performed in the order illustrated, and that all the processing represented by the operations may not be necessary to practice the invention. Further, the processes described in FIGS. 2 and 3 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the details, figures and the appended claims given herein.

What is claimed is:

1. A computer system comprising:
   a processor;
   a memory system;
   an operating system; and
   a Java virtual machine including:
      a just in time (JIT) Java compiler including at least one optimizer, each one of the at least one optimizer including:
         logic for recognizing a pattern in a received Java byte code, wherein the pattern includes a conditional branch instruction;
         logic for optimizing the recognized pattern to produce optimized native code including:
            logic for analyzing the conditional branch instruction and a subsequent set of instructions;
            logic for replacing the conditional branch instruction with a conditional instruction; and
            logic for compiling the conditional instruction in native code; and
         logic for outputting optimized native code.

2. The system of claim 1, wherein the least one optimizer is at least partially coded in logic circuitry.

3. The system of claim 1, wherein the least one optimizer is at least partially coded in software.

4. A computer system comprising:
   a processor;
   a memory system;
   an operating system; and
   a Java virtual machine including:
      a just in time (JIT) Java compiler including at least one optimizer that is at least partially coded in logic circuitry, each one of the at least one optimizer including:
         logic for recognizing a pattern in a received Java byte code that includes a branching instruction that can be optimized in a native code conditional instruction;
         logic for optimizing the recognized pattern to produce optimized native code including:
            logic for analyzing the conditional branch instruction and a subsequent set of instructions;
            logic for replacing the conditional branch instruction with a conditional instruction; and
            logic for compiling the conditional instruction in native code; and
         logic for outputting optimized native code to a native processing platform.

5. A method of optimizing a Java byte code comprising:
   receiving the Java byte code in a JIT compiler;
   analyzing the Java byte code to determine if the Java byte code includes one of a plurality of preselected patterns wherein the pattern includes a conditional branch instruction;
   producing an optimized native code from the Java byte code including one of the plurality of preselected patterns including:
      analyzing the conditional branch instruction and a subsequent set of instructions;
      replacing the conditional branch instruction with a conditional instruction; and
      compiling the conditional instruction in native code; and
   outputting the optimized native code.

6. The method of claim 5, wherein the JT compiler is included in a Java virtual machine.

7. The method of claim 5, wherein analyzing the Java byte code to determine if the Java byte code includes one of the plurality of preselected patterns includes recognizing a trigger-type instruction.

8. The method of claim 7, wherein the trigger-type instruction is a forward branching instruction.

9. The method of claim 7, wherein the plurality of preselected patterns are encoded in the JIT compiler.

10. The method of claim 7, wherein if the trigger-type instruction is recognized, further comprising examining a number of subsequent instructions from the Java byte code.

11. The method of claim 10, wherein the number of subsequent instructions to be examined is determined by the recognized trigger-type instruction.

12. The method of claim 5, wherein outputting the optimized native code includes outputting the optimized native code to a processor platform.

* * * * *